United States Patent
Watkins et al.

(10) Patent No.: US 10,862,736 B2
(45) Date of Patent: *Dec. 8, 2020

(54) OBJECT COUNTS PERSISTENCE FOR OBJECT STORES

(71) Applicant: HEWLETT PACKARD ENTERPRISE DEVELOPMENT LP, Houston, TX (US)

(72) Inventors: Glenn S. Watkins, Northborough, MA (US); John Michael Czerkowicz, Wakefield, MA (US); Sumit Narayan, Westborough, MA (US); George A. Klarakis, Newton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,768

(22) Filed: Jan. 30, 2020

(65) Prior Publication Data
US 2020/0169449 A1 May 28, 2020

Related U.S. Application Data

(63) Continuation of application No. 15/884,150, filed on Jan. 30, 2018, now Pat. No. 10,587,454.

(51) Int. Cl.
*G06F 15/16* (2006.01)
*H04L 12/24* (2006.01)
*H04L 29/08* (2006.01)

(52) U.S. Cl.
CPC ........ *H04L 41/044* (2013.01); *H04L 67/1095* (2013.01); *H04L 67/1097* (2013.01); *H04L 67/2852* (2013.01)

(58) Field of Classification Search
CPC ............. H04L 67/2852; H04L 67/1097; H04L 67/1095
See application file for complete search history.

(56) References Cited

U.S. PATENT DOCUMENTS 4,716,524 A * 12/1987 Oxley ................. G06F 12/0261
711/219
6,895,481 B1 * 5/2005 Mitten ................ H04L 12/1854
370/498

(Continued)

FOREIGN PATENT DOCUMENTS

CN 101930442 A 12/2010

OTHER PUBLICATIONS

You et al., "Deep Store: An Archival Storage System Architecture", Proceedings of the 21st International Conference on Data Engineering (ICDE 2005), 2005, 12 pages.

(Continued)

*Primary Examiner* — Hieu T Hoang
(74) *Attorney, Agent, or Firm* — Hewlett Packard Enterprise Patent Department

(57) ABSTRACT

In an example, a system includes network nodes implementing an object store. The system may determine reference count updates for objects stored on the object store, and delay persisting the reference count updates to a persistent storage. The system may cancel reference count updates that increments and decrement between the determined reference count update and another reference count update received during the delay in persisting the reference count update to the persistent storage to minimize writing to the object record.

17 Claims, 6 Drawing Sheets

(56) References Cited

U.S. PATENT DOCUMENTS

| | | | |
|---|---|---|---|
| 7,103,595 B2 | 9/2006 | Anastasiadis et al. | |
| 7,139,781 B2 | 11/2006 | Young et al. | |
| 7,454,592 B1 | 11/2008 | Shah et al. | |
| 7,747,663 B2 | 6/2010 | Atkin et al. | |
| 7,814,078 B1 | 10/2010 | Forman et al. | |
| 8,028,106 B2 | 9/2011 | Bondurant et al. | |
| 8,140,625 B2 | 3/2012 | Dubnicki et al. | |
| 8,140,786 B2 | 3/2012 | Bunte et al. | |
| 8,224,935 B1 | 7/2012 | Bandopadhyay et al. | |
| 8,457,018 B1 | 6/2013 | Ruef et al. | |
| 8,478,799 B2 | 7/2013 | Beaverson et al. | |
| 8,655,919 B2 | 2/2014 | Cachin et al. | |
| 9,378,088 B1* | 6/2016 | Piszczek | G06F 3/0685 |
| 9,477,551 B1* | 10/2016 | Piszczek | G06F 3/0617 |
| 10,416,928 B2* | 9/2019 | Aston | G06F 3/067 |
| 2003/0093652 A1* | 5/2003 | Song | G06F 9/30167 |
| | | | 712/217 |
| 2004/0148306 A1 | 7/2004 | Moulton et al. | |
| 2004/0255087 A1* | 12/2004 | Pudipeddi | G06F 12/0261 |
| | | | 711/152 |
| 2006/0036898 A1 | 2/2006 | Doering | |
| 2006/0167960 A1* | 7/2006 | Lomet | G06F 16/2322 |
| 2012/0047115 A1* | 2/2012 | Subramanya | G06F 16/1727 |
| | | | 707/696 |
| 2013/0246374 A1* | 9/2013 | Takano | G06F 16/215 |
| | | | 707/692 |
| 2015/0100730 A1* | 4/2015 | Kandiyanallur | G06F 12/121 |
| | | | 711/118 |
| 2015/0294436 A1* | 10/2015 | Jin | G06T 15/005 |
| | | | 345/543 |
| 2017/0315740 A1* | 11/2017 | Corsi | G06F 3/0688 |
| 2018/0239597 A1* | 8/2018 | Kawachiya | G06F 9/4488 |
| 2018/0253255 A1* | 9/2018 | Jain | G06F 3/0673 |
| 2018/0260255 A1* | 9/2018 | Yazdani | G06F 9/524 |
| 2018/0329785 A1* | 11/2018 | Mosek | G06F 11/1464 |

OTHER PUBLICATIONS

Zhu et al., "Avoiding the Disk Bottleneck in the Data Domain Deduplication File System", FAST'08: Proceedings of the 6th USENIX Conference on File and Storage Technologies, 2008, pp. 269-282.

Abd-El-Malek et al., "Ursa Minor: Versatile Cluster-Based Storage", Proceedings of the 4th FAST'05 conference on USENIX Conference on File and Storage Technologies, Dec. 13-16, 2005, 14 pages.

Agrawal et al., "Design Tradeoffs for SSD Performance", USENIX'08: 2008 USENIX Annual Technical Conference, 2008, pp. 57-70.

Alan Freedman, "Computer Desktop Encyclopedia", 9th Edition, Osborne/McGraw-Hill, 2001, 7 pages.

AMD Athlon™, "AMD Athlon™ Processor: Technical Brief", Publication # 22054, Rev. D, Dec. 1999, 10 pages.

AMD Athlon™, "Recommendations for an AMD Athlon™ Processor-Based Computer", Processor Quick Reference FAQ, Feb. 3, 2000, pp. 1-12.

Andrew S. Tanenbaum, "Modern Operating Systems", Second Edition, 2001, 7 pages.

Arvid Norberg, "Overview", available online at <https://www.rasterbar.com/products/libtorrent/manual.html>, version 0.16.18, 2005, 90 pages.

Auburn Liabraries, "Scan of CD-ROM and CD-ROM Case, Operating Systems Review" Proceedings of the 18th ACM Symposium on Operating Systems Principles (SOSP'01), Oct. 21-24, 2001, CD-ROM obtained from the Auburn University Library, 1 page.

Best, et al., "How the Journaled File System handles the on-disk layout", May 2000, IBM: developerWorks: Linux library/Open source library Internet download Apr. 18, 2001; (Springpath Exhibits 1011 & 1111), 30 pages.

Bibliographic Record Information, "The Design and Implementation of the FreeBSD Operating System", 2005, available at the online catalog of the Library of Congress, accessed Aug. 3, 2017, 4 pages.

Bobbarjung et al., "Improving Duplicate Elimination in Storage Systems", ACM Transactions on Storage, vol. 2, No. 4, 2006, pp. 1-23.

Boehm et al., "Garbage Collection in an Uncooperative Environment", Software Practice & Experience, vol. 18, No. 9, Sep. 1988, pp. 1-17.

Bruce Eckel, "C++ Inside & Out", Osborne McGraw-Hill, 1993, 6 pages.

Bruce Schneier, "Applied Cryptography, 2d Edition: Protocol, Algorithms, and Source Code in C", John Wiley & Sons, Inc., 1996, 4 pages.

Bryan Pfaffenberger, "Webster's New World Computer Dictionary", 10th Ed., 2003, 5 pages.

Chaves et al., "Cost-Efficient SHA Hardware Accelerators", IEEE Transactions on Very Large Scale Integration (VLSI) Systems, vol. 16, No. 8, Aug. 2008, pp. 999-1008.

Chun, et al., "Efficient Replica Maintenance for Distributed Storage Systems", USENIX Association, NSDI '06: 3rd Symposium on Networked Systems Design & Implementation, 2006, pp. 45-58.

Cox et al., "Pastiche: Making Backup Cheap and Easy", ACM SIGOPS Operating Systems Review—OSDI '02: Proceedings of the 5th Symposium on Operating Systems Design and Implementation, vol. 36, 2002, 14 pages.

Dabek et al., "Designing a DHT for low Latency and High Throughput", Proceedings of the First Symposium on Networked Systems Design and Implementation, Mar. 29-31, 2004, 15 pages.

Dabek et al., "Wide-area cooperative storage with CFS", Operating Systems Review—Proceedings of the 18th ACM Symposium on Operating Systems Principles (SOSP'01), vol. 35, No. 5, 2001, 14 pages.

David Bader, "Declaration of David Bader, Under 37 C.F.R. .sctn. 1.68", dated Aug. 10, 2017, 31 pages.

Debnath et al., "ChunkStash: Speeding up Inline Storage Deduplication using Flash Memory", USENIX Annual Technical Conference (ATC), 2010, pp. 1-15.

Decision Denying Institution of Inter Partes Review, Case IPR2017-01933, U.S. Pat. No. 8,478,799 B2, Mar. 16, 2018, pp. 1-18, USPTO.

Declaration of Darrell D.E.Long, Ph.D. Regarding U.S. Pat. No. 8,478,799 dated Sep. 14, 2016, Case IPR2016-01779 (Springpath Exhibit 1002), 109 pages.

Declaration of Darrell D.E.Long, Ph.D. Regarding U.S. Pat. No. 8,478,799 dated Sep. 14, 2016, Case IPR2016-01780 (Springpalh Exhibit 1102), 114 pages.

Defendant Springpath, Inc.'s Motion for Leave to File Supplemental Claim Construction Brief, Case 4:15-cv-13345-TSH, Document 146, Oct. 17, 2017, pp. 1-5.

Defendant Springpath, Inc.'s Preliminary Claim Construction Brief with Exhibits, Case 4:15-cv-13345-TSH, Document 129, Jul. 10, 2017, pp. 1-138.

Defendant Springpath, Inc.'s Repiy Claim Construction Brief, Case 4:15-cv-13345-TSH, Document 133, Jul. 24, 2017, pp. 1-17.

Dr. Brent Welch, "Object Storage Technology", Storage Networking Industry Association, 2013 pp. 1-42.

Dr. Prashant Shenoy, "Curriculum Vitae of Dr. Prashant Shenoy", 2017, 31 pages.

EMC Corporation and Tower Technology, Inc, "The EMC Centera and Tower Technology Advantage", EMC White Paper, Jul. 2002, pp. 1-8.

Frank Dabek, "A Distributed Hash Table," Sep. 2005, pp. 1-135.

Frequently Asked Questions for FreeBSD 2.X, 3.X and 4.X-, available online at <https://web.archive.org/web/20020404064240/http://www.freebsd.org:80/doc/en_US.ISO8859-1/books/faq/install.html>, Apr. 4, 2002, 8 pages.

Fu et al., Fast and Secure Distributed Read-Only File System, ACM Transactions on Computer Systems, vol. 20, No. 1, Feb. 2002, pp. 1-24.

Garth Gibson, et al., "A Cost-Effective, High-Bandwidth Storage Architecture," Proceedings of the 8th Conference on Architectural Support for Programming Languages and Operating Systems, 1998, pp. 92-103.

(56) References Cited

OTHER PUBLICATIONS

Grembowski et al., "Comparative Analysis of the Hardware Implementations of Hash Functions SHA-1 and SHA-512", Information Security. ISC 2002, Lecture Notes in Computer Science, vol. 2433, 2002, pp. 75-89.
Harel Paz, "Efficient Memory Management for Servers", Research Thesis Submitted to the Senate of the Technion—Israel Institute of Technology, Aug. 2006, 228 pages.
Hasan, et al., "A Survey of Peer-to-Peer Storage Techniques for Distributed File Systems", International Conference on Information Technology: Coding and Computing, 2005, 9 pages.
Hewlett Packard Enterprise Company's Response to Springpath's Supplemental Claim Construction Brief, C.A. No. 4:15-cv-13345-TSH, Oct. 30, 2017, pp. 1-5.
Hitz et al., "File System Design for an NFS File Server Appliance", Technical Report 3002, Rev. C 3/95, USENIX Winter 1994, Jan. 19, 1994, 23 pages.
Hutchinson et al., "Logical vs. Physical File System Backup", Proceedings of the 3rd Symposium on Operating Systems Design and Implementation, New Orleans, Louisiana, Feb. 1999, 12 pages.
IBM, "General Programming Concepts: Writing and Debugging Programs", 9th Edition, AIX 5L Version 5.2, Aug. 2004, 616 pages.
IBM, "System Management Concepts: Operating System and Devices", AIX 5L Version 5.2, May 2004, 7th ed., 190 pages.
IEEE, "1003.1 (Trademark): Standard for Information Technology—Portable Operating System Interface (POSIX®)", Rationale (Informative), Issue 6, 2001, 344 pages. ("POSIX_SI_2001")(SPR00000463-SPR00000464).
Ingrid Hsieh-Yee, "Declaration of Ingrid Hsieh-Yee, PhD, Under 37 C.F.R .sctn. 1.68 in Support of Petition for Inter Partes Review of U.S. Pat. No. 8,478,799", dated Aug. 10, 2017, 77 pages.
Joint Claim Construction and Prehearing Statement, Case 4:15-cv-13345-TSH, Document 136, Aug. 7, 2017, pp. 1-8.
Josh Cates, "Robust and Efficient Data Management for a Distributed Hash Table", Massachusetts Institute of Technology, Jun. 2003, pp. 1-64.
Kawaguchi et al., "A Flash-Memory Based File System", USENIX 1995, 1995, 10 pages.
Lee, et al., "A Case for Flash Memory SSD in Enterprise Database Applications", SIGMOD'08, Jun. 9-12, 2008, pp. 1075-1086.
León et al., "Object Storage versus Block Storage: Understanding the Technology Differences", available online at https://www.druva.com/blog/object-storage-versus-block-storage-understanding-technology-differences/, Aug. 14, 2014, (last visited Dec. 22, 2016), SimpliVity Exhibit 2004, *Springpath* v. *SimpliVity* IPR2016-01779, 7 pages.
Levanoni et al., "An On-the-Fly Reference-Counting Garbage Collector for Java", ACM Conference on Object-Oriented Programming, Systems, Languages, and Applications (OOPSLA'01), Oct. 2001, 67 pages.
Li, et al., "Secure Untrusted Data Repository (SUNDR)", USENIX Association OSDI '04: 6th Symposium on Operating Systems Design and Implementation, Dec. 6-8, 2004, pp. 121-136, (Springpath Exhibits 1003 & 1103).
Library of Congress, "Bibliographic Record Information for Operating Systems Review", Proceedings of the 18th ACM Symposium on Operating Systems Principles (SOSP'01), 2001, available at the online catalog of the Library of Congress, accessed Jul. 31, 2017, 3 pages.
Marice J. Bach, "The Design of the UNIX Operating System", Prentice-Hall Software Series, 1986, 8 pages.
Martin Placek, "Storage Exchange: A Global Platform for Trading Distributed Storage Services", Master of Engineering Science Thesis, The University of Melbourne, Australia, Jul. 2006, 185 pages.
McKusick et al., "A fast file system for UNIX", ACM Transactions on Computer Systems, vol. 2, No. 3, Aug. 1984, pp. 181-197.
McKusick et al., "The Design and Implementation of the FreeBSD Operating System", FreeBSD version 5.2, CSCO-1011, (2005), pp. 1-43.

Mendel Rosenblum, "The Design and Implementation of a Log-Structured File System", Kluwer Academic Publishers, 1995, 3 pages.
Mesnier et al., "Storage Area Networking: Object-Based Storage", IEEE Communications Magazine, vol. 41, Aug. 2003, pp. 84-90.
Michele Nelson, "Declaration of Michele Nelson, Under 37 C.F.R .sctn. 1.68", Aug. 9, 2017, pp. 1-91.
Microsoft Corporation, "Computer Dictionary", 5th Edition, 2002, 7 pages.
Muthitacharoen, et al., "Ivy: A Read/Write Peer-to-Peer File System", Proceedings of the 5th Symposium on Operating Systems Design and Implementation (OSDI '02), Operating Systems Review, vol. 36, Dec. 2002, 14 pages.
Nitheesh Poojary, "Understanding Object Storage and Block Storage Use Cases", available online at <http://cloudacademy.com/blog/object-storage-block-storage/>, Mar. 12, 2019, 6 pages.
Operating Systems Review—Proceedings of the 18th ACM Symposium on Operating Systems Principles (SOSP'01), vol. 35, No. 5. pp. 202-215, Oct. 21-24, 2001, obtained from a CD-ROM from Auburn University, 11 pages.
Patent Owner's Preliminary Response Pursuant to 37 CFR 42.107(a), Case IPR2017-01933, U.S. Pat. No. 8,478,799, Dec. 21, 2017, pp. 1-47.
Petition for Inter Partes Review of U.S. Pat. No. 8,478,799 filed Aug. 11, 2017, case IPR2017-01933, 92 pages. The citations from PIR2017-01933 are submitted herewith below.
Petition for Inter Partes Review of U.S. Pat. No. 8,478,799 before the USPTO Patent Trial and Appeal Board dated Sep. 14, 2016, Case IPR2016-01779, 59 pages.
Petition for Inter Partes Review of U.S. Pat. No. 8,478,799 before the USPTO Patent Trial and Appeal Board dated Sep. 14, 2016, Case IPR2016-01780, 66 pages.
Petitioner's Reply to Patent Owner's Preliminary Response, Case IPR2017-01933, U.S. Pat. No. 8,478,799, Feb. 28, 2018, pp. 1-17.
Prashant Shenoy, "Declaration of Prashant Shenoy. PhD, Under 37 C.F.R. .sctn. 1.68 in Support of Petition for Inter Partes Review of U.S. Pat. No. 8,478,799", dated Aug. 11, 2017, pp. 1-196.
Prashant Shenoy, et al., "Symphony: An Integrated Multimedia File System," Proceedings of SPIE 3310, Multimedia Computing and Networking 1998, pp. 124-138.
Preliminary information, AMD Athlon, Processor Module Data Sheet, AMD .Athlon, Publication #21016, Rev. M, Issue Date:,Jun. 2000, 74 pages.
Prosecution History of the U.S. Pat. No. 8,478,799 patent, 576 pages.
Quinlan et al., "Venti: a new approach to archival storage", FAST '02: Proceedings of the 1st USENIX Conference on File and Storage Technologies, Jan. 2002, pp. 1-13.
R. Rivest, "The MD5 Message-Digest Algorithm", Request for Comments: 1321, Internet Engineering Task Force, Apr. 1992, pp. 1-21.
Response to U.S. final Office Action dated Feb. 22, 2013 filed May 8, 2013 in U.S. Appl. No. 12/823,922 (Springpath Exhibits 1012 & 1112), 48 pages.
Response to U.S. non-final Office Action dated Aug. 30, 2012 filed Dec. 18, 2012 in U.S. Appl. No. 12/823,922 (Springpath Exhibits 1009 & 1109), 148 pages.
Rhea et al., "Fast, Inexpensive Content-Addressed Storage in Foundation", Proceeding of USENIX 2008 Annual Technical Conference, 2008, pp. 1-14.
Ritchie et al., "The UNIX Time-Sharing System", Communications of the ACM, vol. 17, No. 7, Jul. 1974, pp. 365-375.
Sandberg et al., "Design and Implementation of the Sun Network Filesystem", Appeared at the USENIX Conference & Exhibition, 1985, pp. 119-130.
SimpliVity Corporation's Markman Hearing Transcript, Case No. 15cv13345-TSH, Aug. 16, 2017, pp. 1-119.
Simplivity Corporation's Opening Claim Construction Brief, Case 4:15-cv-13345-TSH, Document 130, Jul. 10, 2017, pp. 1-21.
Simplivity Corporation's Reply Claim Construction Brief, Case 4:15-cv-13345-TSH, Document 132, Jul. 24, 2017, pp. 1-23.

(56) References Cited

OTHER PUBLICATIONS

Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1.
Stevens et al., "The First Collision for Full SHA-1", International Association for Cryptologic Research, 2017, pp. 570-596.
U.S. Provisional App. Filed on Jun. 26, 2009, 32 pages., U.S. Appl. No. 61/269,633.
U.S. Patent and Trademark Office final Office Action dated Feb. 22, 2013 in U.S. Appl. No. 12/823,922 (Springpath Exhibits 1010 & 1110), 26 pages.
U.S. Patent and Trademark Office non-final Office Action dated Aug. 30, 2012 in U.S. Appl. No. 12/823,922 (Springpath Exhibits 1006 & 1106), 32 pages.
U.S. Patent and Trademark Office Notice of Allowance dated May 29, 2013 in U.S. Appl. No. 12/823,922 (Springpath Exhibits 1013 & 1113), 12 pages.
USPTO PTAB Decision Denying Institution of Inter Partes Review entered Mar. 21, 2017, *Springpath, Inc.* v. *SimpliVity Corp.*, Case IPR2016-01780, U.S. Pat No. 8,478,799 B2, 15 pages.
USPTO PTAB Decision Denying Institution of Inter Partes Review entered Mar. 22, 2017, *Springpath, Inc.* v. *SimpliVity Corp.*, Case IPR2016-01779, U.S. Pat No. 8,478,799 B2, 15 pages.
USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below), 44 pages.
USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted), 48 pages.
Vangie Beal, "Inode", Webopedia, 2016, 2 pages.
Vangie Beal, "Namespace", Webopedia, 2016, 2 pages.
Wang et al., "OBFS: A File System for Object-based Storage Devices", Apr. 2004, SimpliVity Exhibit 2006, *Springpath v. SimpliVity* IPR2016-01779, 18 pages.
Wikipedia, "Namespace", available online at <https://en.wikipedia.org/w/index.php?title=Namespace&oldid=937984602>, Jan. 28, 2020, 4 pages.
Wikipedia, "Object Storage", available online at <https://en.wikipedia.org/w/index.php?title=Object_storage&oldid=930325802>, Dec. 11, 2019, 4 pages.
WRLC, "Bibliographic Record Information for Operating Systems Review"—Proceedings of the Fifth ACM Symposium on Operating Systems Design and Implementation (OSDI'02), available at the WRLC online catalog, Dec. 9-11, 2002, 2 pages.
Xie, et al., "Oasis: An active storage framework for object storage platform", Future Generation Computer Systems, vol. 56, Mar. 2016, pp. 746-758.

* cited by examiner

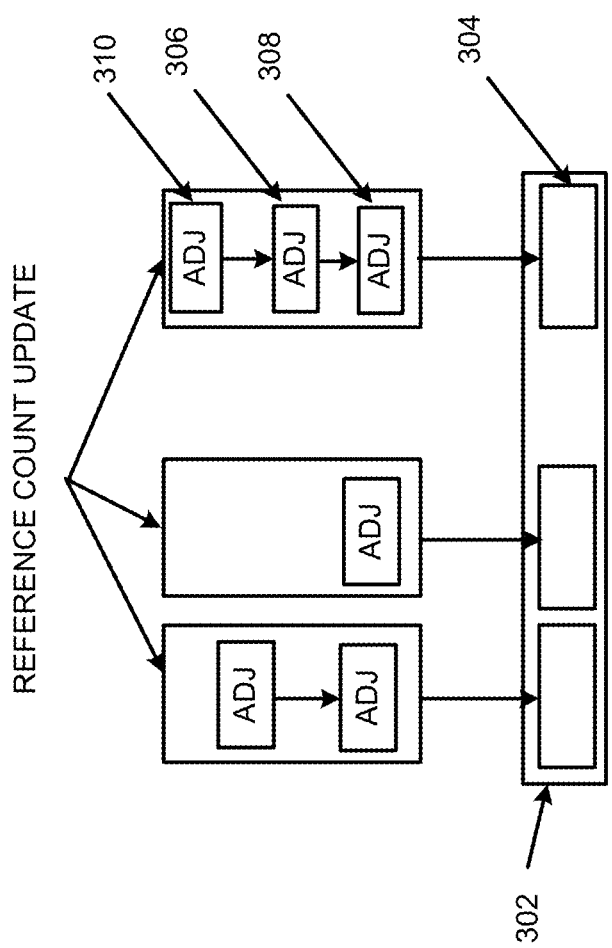

OBJECT COUNTS PERSISTENCE FOR OBJECT STORES

BACKGROUND

File systems are used to control how data is stored and retrieved. The file system allows differentiation of information placed in a medium. One method of differentiating the information on a medium is to separate the data into pieces and to give each piece a name. There are different kinds of file systems having different structures, logic, properties of speed, flexibility, security, size and the like. File systems may be implemented on one or more nodes of a federated system of nodes.

Federated systems are a collection of nodes. In an example, the nodes may act in a peer-to-peer network without a centralized authority. In a decentralized network, peers communicate among themselves to resolve state. The nodes in the federated system may communicate with each other regarding the underlying state including the state of the file system.

BRIEF DESCRIPTION OF DRAWINGS

Examples are described in detail in the following description with reference to the following figures. In the accompanying figures, like reference numerals indicate similar elements.

FIG. 3 illustrates a bucket buffer according to an example;

DETAILED DESCRIPTION

Figure 1:
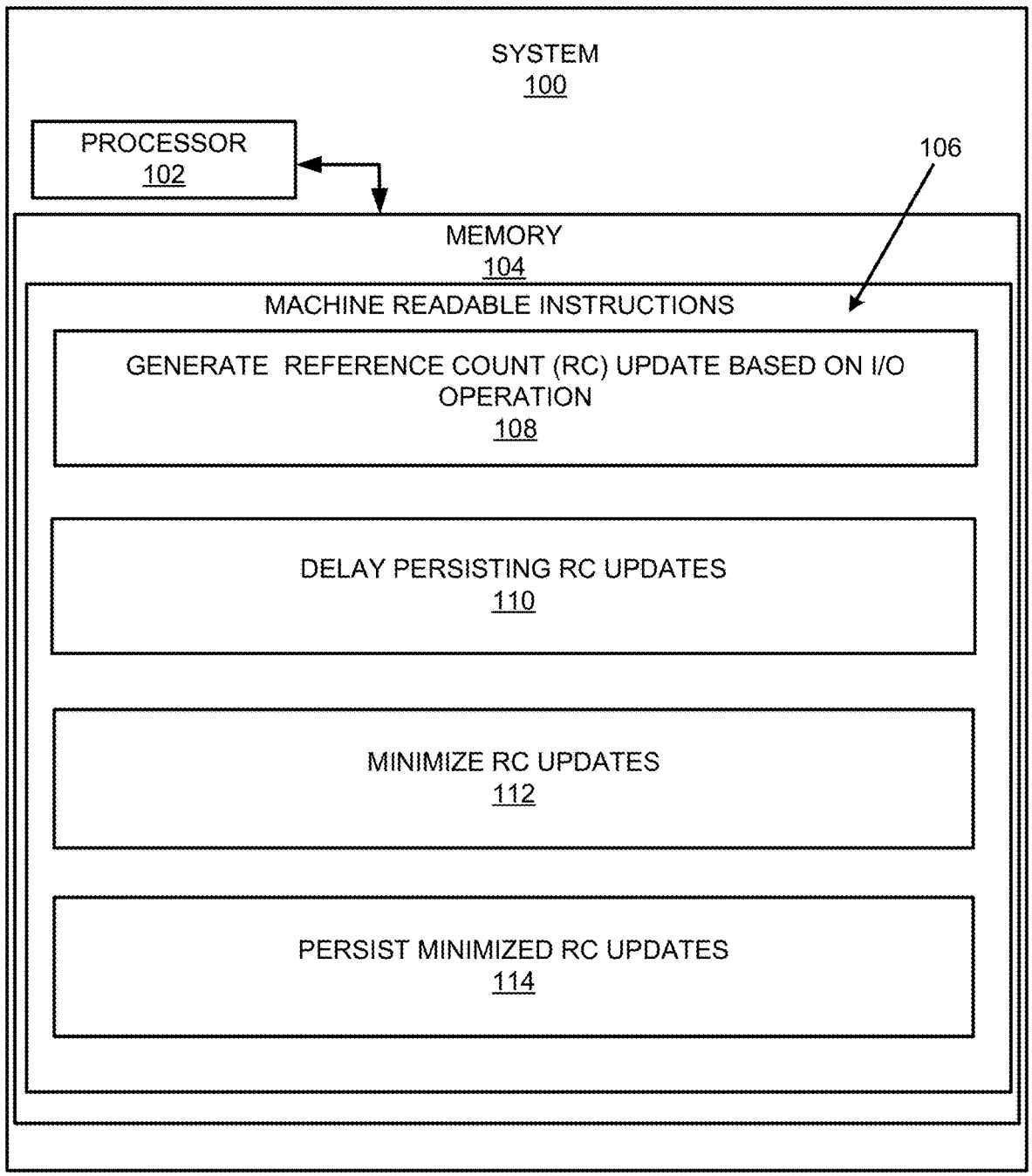
FIG. 1 illustrates an example of a system for optimizing reference count (RC) updates to objects on an object store.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well-known methods and/or structures have not been described in detail so as not to unnecessarily obscure the description of the embodiments and examples described herein.

According to an example of the present disclosure, a system may minimize writing reference count (RC) updates to an object record in a node on the object store. The object record for an object may be stored in an object index on a persistent storage. In an example, an RC in an object record of an object may be increased by the number of times the object was referenced or decreased by the number of times the object was dereferenced. The system to minimize the writing of updates to the object record may collect RC updates of an object in a buffer and process them to cancel RC updates that reference the object against RC updates that dereference the object before writing the RC updates to the object record on the persistent storage.

In an example, a request to store an already existing object may be described as referencing an object. Similarly, a request to delete an object may be described as dereferencing the object. The system may delay persisting an RC update (i.e., collect the RC update in a buffer) to cancel the increments and decrements to the RC received during the delay before writing the final count to the object record of an object. The system may retrieve the current RC from the object record stored in the object index.

An object may be the smallest data structure in the object store storing data or metadata. In an example, the hierarchical relationship between objects may be described using metadata. A signature may be a cryptographic hash of the object's content generated according to a cryptographic function that uniquely identifies the object. In an example, an RC of an object record of an object may be increased by the number of times the object was referenced or decreased by the number of times the object was dereferenced.

In an example, the system may use the object index to de-duplicate objects in the object store. The object index may include an object record with the RC of the object. The system may update the RC in the object record, instead of storing a duplicate of the object again in the object store.

In an example, the system may collect RC updates to objects located on more than one hierarchical level in the object store. In an example, the system may store objects that are cryptographically unique compared to other objects stored in the persistent media, and store subsequent requests to store the same object with the same signature as RC's in the object record of the stored object.

In an example, the system may encode the contents of an object using a cryptographic function (e.g., generate a hash of the object according to the cryptographic function) to determine the signature unique to that object. A change in the contents of the object may change the signature of that object. In an example, the object store may use a signature for an object to identify the object in the object store, wherein each object in the object store exhibits a hierarchical relationship from the root object ending in child objects located furthest from the root object. Each signature in the object store is globally unique, meaning that the identifier is unique across all nodes in an object store. In an example, unique may mean the probability of collision between signatures is astronomically small. For example, using an ideal cryptographic function with the output size of n, where there are p objects then the possibility of collision is $p^2/2^{n+1}$ provided p is smaller than $2^{n/2}$. For example, with SHA-256 (n=256) and one billion objects ($p=10^9$), the probability of collision is $4.3 \times 10^{-60}$. In an example, the child object farthest from the root object may be referred to as a leaf object. The leaf object may be at hierarchical distance of n, where n is an integer. Distance may be based on levels of the hierarchy of objects.

Objects in the object store may be hierarchically related to a root object. The root object includes the signatures of child objects forming a part of the contents of a root object. The signature of the root object is generated based on the signature of child objects at a hierarchical distance of one from the parent object. The child objects, in turn, include the signature of their child objects. Therefore, each object in the object store may be accessed from the root object. A child object of the root object may be any object hierarchically related to the root object. In the object store the root object may have one or more child objects at a first hierarchical level directly below the root object. The child object at the first hierarchical level may have its own child object at a second hierarchical level directly below the child object. The root object may be described as a grandparent object of the child object. Similar descriptions may be used for other examples where grandparent objects are objects separated by at least two hierarchical levels.

In an example, the system may collect RC updates to objects located on more than one hierarchical level in the object store in a bucket buffer prior to persisting the RC updates. The bucket buffer may be associated with an internal index hash table bucket sorting function. The system may delay persisting the RC updates to minimize the number of changes to the corresponding object records, i.e., minimize writing RC updates to object records. The system may cancel increments and decrements to RCs for the objects by canceling the generated RC updates against other RC updates for the object received during the delay in persisting the RC updates to the object record. In an example, an object record may be stored in an object index. In an example, the system may minimize writing an RC update to an object record by canceling RC increments with RC decrements in the bucket buffer, thereby avoiding changes to the object record of the object. For example, an increment to an RC for an object is stored in the bucket buffer and may not be persisted immediately, because a decrement to the RC may be received which would nullify the original increment. The object index may comprise individual object records. Each object record may associate a signature with an RC and the physical location where the associated data is stored. In an example, the object record may include the signature of the object, RC of the object and the location where the object is stored.

Each object in the object store may be stored multiple times by virtual machines that request the system to store data on nodes of the object store. When an object is stored multiple times, the RC of the object in the object record may be incremented instead of storing the object again on persistent storage. When an object is deleted, the RC in the object record on persistent storage may be decremented instead of deleting the object. In an example, to minimize writing the RC of the object to the object record, the system may generate an RC update to indicate an intent to change (increase or decrease) the RC in the object record. The RC update of an object may be stored in a bucket buffer. In an example, to minimize writing the RC of the object to the object record when an object is deleted the system may generate an RC update indicating an intent to decrease the RC in the object record of the object on persistent storage. The object may be permanently deallocated when the RC hits zero. For example, the operating system and programs installed on multiple virtual machine, the operating system and programs are merely instances of the same set of objects. The operating system and programs may be stored once in one or more objects on the object store using RCs on the object record instead of storing multiple copies in persistent storage.

According to an example of the present disclosure, the system may minimize writing RC updates to object records. In examples, the RC updates may be generated when the content of a child object changes and the changes are persisted to the parent object in the form of signature changes, which generates a modified parent object. In an example, the modified parent object is stored alongside the parent object in persistent storage. The parent object may be deallocated if the RC for the parent object is zero in the object record. In another example, the modified parent object may replace the parent object. For example, the system may replace the parent object with the modified parent object when the RC of the parent object is zero in the object record after the parent object is modified. A change in the contents of the parent object may result in changes to the RCs. For example, a child object may no longer be referenced by the parent object. Similarly, the modified parent object may start referencing the child object. The RC of the child object is incremented for a transient period because the child object is referenced by both the parent object and the modified parent object before the RC is decremented again. For example, when the system updates the RC updates in the order in they are received, the RC in the object record of the child object is incremented when the modified parent object is created. Subsequently, the parent object may be removed from the system when the RC of the parent object is set to zero. The system may then receive another RC update to the child object that decrements the RC in the object count stored in the persistent storage. Thus, the system may minimize writing RC updates to an object record in the object store.

In another example, moving a child object between two parent objects may result in a transient increment of the RC of the child object followed by a decrement of the RC of the child object. In an example, the system may minimize writing an RC update to an object record on persistent storage. The system may delay RC updates by storing RC increments in the bucket buffer to prevent two writes to the object record of the object. The buffer bucket may store RC updates. The system may use the bucket buffer to delay persisting the RC update to cancel the RC update against another RC update received for the object during the delay in persisting the RC update. The system may identify increments and decrements to the same object in the bucket buffer RC updates such as the RC update and another RC update using the signature of the object. The system may use the bucket buffer to increment/decrement the RC updates before writing them to the object record of the object irrespective of the order of arrival of RC increments or decrements. In an example, the bucket buffer may collect RC update increments and decrements of one or more child objects that are stored in the same node in a federated peer-to-peer network, or near each other in persistent storage, or the like. For example, one or more child objects may be stored in the same persistent storage such as a solid-state drive (SSD) drive.

In an example, the system may minimize writing RC updates to object records in multiple hierarchical levels that are closely related to each other. For example, objects stored locally may be updated more easily because they may be contiguous and may not increase write amplification. For example, moving files stored in one directory to another may result in RC update increments to the child objects followed by RC update decrements to the child object after the files are moved. The system may use the bucket buffer to minimize writing to the object record in persistent storage.

In an example, minimizing the RC update writes to persistent storage in multiple hierarchical levels may be staggered by processing RC updates to objects in the same multiple hierarchical levels together. For example, RC updates in multiple hierarchical levels such as a child object, a parent object and a grandfather object may be optimized to minimize writing the transient RC updates to persistent storage. For example, simultaneously or subsequently, RC updates in the same or similar hierarchical levels may cancel each other. The RC updates in the same or similar hierarchical levels may be processed before upper hierarchical levels beyond the grandfather object of the child object are processed. In an example, the grandfather object may be located three hierarchical levels from the child object and all child objects below the grandfather object may be processed to cancel increments and decrements to the RC updates for these objects.

Also, the system may allow access to objects in the object store that have a signature generated using a cryptographic function (e.g., by hashing the object according the cryptographic function). Each identifier in the object store is globally unique, meaning that the identifier is unique across all the nodes in the object store. In an example, objects of the object store are stored in an object store of each node. The object store may be a virtual layer storing the objects and may be present on each node or on some, but not all, nodes. In an example, the object store may be present on each node in the network. The object stores may be described as a local object store, a remote object store or a network object store based on the object store with reference to a node. The object stores may manage and store objects on persistent storage on a node. Examples of persistent storage may include SSD, Non-Volatile Memory (e.g., NVMe), Hard Disk Drives, memristor, OPTANE™ or the like. In an example, a node may be server or a computer connected via a network with other nodes through the network. In other examples, the object store may be located on a remote node connected via a network. Also a node may have one or more object stores.

The signature of an object in the object store may allow the system to store an object once in an object store, i.e., avoiding duplicates. In examples, the system may avoid duplication of the object globally across the nodes of the object store. However, the same object may in instances be replicated (and thus stored more than once) for redundancy, backup and/or quicker access to other nodes such as a remote node or backup node colocated next to a node. For example, objects may be replicated at a remote site periodically for disaster recovery. However, the signature reduces data storage through deduplication. For example, virtual machines may run instances of operating systems, and the virtual machines may be stored on the nodes. The common components of the operating systems may be stored once in one or more objects in a node. Running multiple virtual machine instances may save space by reusing the objects on the node.

An object record may provide information on where an object is stored on a node. The object record may describe where the object is stored on a persistent storage, which may be on a node. In an example, each object in an object store may be unique, e.g., no duplicate objects are stored in an object store. Also, each object in the object store may have an RC associated with the object, and stored in its object record. The RC associated with the object may indicate the number of times the object may be stored externally through a namespace layer. For example, each object in the object store may be stored multiple times in virtual machines that store data on the nodes. The virtual machines may access the stored data using a namespace layer. For example, the operating systems and programs installed on virtual machine instances may be stored once in an object on the object store.

Metadata objects store information about objects. In an example, a root object snapshot may be used to synchronize local data stores and a remote data store, such as for disaster recovery, data replication and the like. An object stored in the object store may include data or metadata.

For example, a parent object may include signatures of child objects in the object store. When a child object's content is modified, the identifier of the modified child object is determined according to the cryptographic function. Similarly, a new object changes the contents of its parent object, i.e., the signature of the new object is included in the parent object to generate a modified parent object. In an example, the modified parent object may be stored alongside the parent object. In another example, the modified parent object may replace the parent object. When a child object's content is modified or when a new object is created, the parent object's content changes, and the signature of the modified child object or the new object is determined according to the cryptographic function. Thus, when, an object is modified, the content of the object changes, the signature of the object changes, because the signature is based on the content of the object. This change percolates upwards towards the root object.

In an example, one or more objects in the object store may exhibit a relationship described by a directed acyclic graph (DAG). For example, a DAG may include objects such as the root object, and a hierarchy of objects below the root object ending in one or more leaf objects. The DAG may include many vertices (objects) and edges (links between objects), with each edge directed from one vertex to another such that there is no way to start at any random vertex and follow a consistently directed sequence of edges that eventually loops back to the random vertex again. Also, the DAG may include a topological ordering and a sequence of vertices such that every edge is directed from an earlier vertex to a later vertex in the sequence. In an example, the DAG may be a blockchain storage. The blocks in the blockchain may be the vertices and the edges may be the last block of the blockchain or may be abandoned chains in the blockchain such as forks. In an example, the DAG may include a root object that includes the signature of a child object, the child object in turn including the signature of its child object and so on ending in a leaf object (an object with no child object). The objects may thus have a hierarchical structure where the topological ordering is directed from the root object to farthest child object or leaf object (including the root object) in the sequence. Examples of DAG's may include blockchains or trees. For example, an object store may store one or more objects that are related to each other in the form of a Merkel tree or a modified Merkel tree. In another example, the object store on each node may include objects that form one or more DAG's. For example, a node may store a DAG to back up the current state of an object, and store changes as a new DAG to switch between the current state and the previous state of the object store. In an example, an object store may store one or more objects that are related to each other in the form of a DAG or any other hierarchical structures for storing data with an object signature used to identify each object in the object store.

As is discussed above, according to an example of the present disclosure, the system may minimize writing an RC update to an object record using a bucket buffer. In an example, the bucket buffer may be implemented as an intent. An intent may store the RC increment or decrement temporarily in an RC update until the RC increments or decrements are persisted to the object record on the object index in persistent storage.

A technical problem with persisting RC updates to objects on the persistent storage of the object store without delay is that transient changes may propagate all the way up to the root object during the RC increment and a dereferencing RC update may propagate all the way up to the root object a second time. In examples, the system may include hundreds or thousands of objects that may be changed. Therefore, persisting the RC updates without delay to persistent storage may result in write amplification. In an example, assume in an object store the objects are persisted to is a SSD. The life of an SSD drive is directly proportional to the number of overwrites or writes in place that displaces other data stored in the SSD. Persisting the RC update may change an object record on the SSD. The change in the signature of the child object may then result in a concomitant change to the root object and so on. Thus, persisting RC updates to the persistent storage without delay or optimization such as canceling the RC update increments against RC update decrements in a buffer may result in a shorter SSD life. In an example, the system as described below allows optimization of RC updates by delaying persistence of RC updates and canceling increments and decrements in temporary memory such as a bucket buffer, may increase the life of the SSD.

Another technical problem associated with persisting RC updates to objects on the persistent storage of the object store without optimization is decreased write performance. In an example, persisting hundreds or thousands of changes to the object store may decrease the available input/output operations per second of the system. Another technical problem associated with persisting RC updates on the object store (e.g., on a persistent storage in a node) without delay is network congestion between the nodes. In an example, persisting changes without delay may require hundreds or thousands of transactions. In a federated peer-to-peer system, a node may persist data locally and backup the data to a remote location. Persisting data over the network may require hundreds or thousands of transactions to be sent over the network. This may reduce the efficiency of the network connection and the write performance of the federated peer-to-peer system. In an example, the system as described below allows optimization of RC updates by delaying persistence of RC updates and canceling opposite updates.

Another technical problem associated with persisting RC updates to objects on the object store without optimization is use of inefficient trim top updates. In an example, persisting hundreds or thousands of changes to the object store may keep the object store busy at the lower child levels preventing the roll-up of updates to the root object. Generally, in an active federated node network, the number of updates at the lower level may result in the higher levels of the DAG (e.g., tree) being updated less often compared to the lower levels. The trim top update starts higher than the child object and persists changes to the upper levels of the object store. Using trim top updates on the upper levels without processing the lower child objects increases RC updates that are written to the object record in persistent storage, because the benefits of localized updates to child objects that are close to each other or stored next to each other is not utilized to minimize the writes to the persistent storage. For example, objects updated in the lower hierarchy of the trim top updates may contain increments to RCs and corresponding decrements to RCs, which may be lost when the trip top update begins at a higher hierarchical level without processing the lower hierarchical objects at the lower hierarchical level. In an example, the system as described below allows optimization of RC updates by delaying persistence of RC updates and canceling increments against decrements in other RC updates received during the delay in persisting the RC updates. For example, an RC increment of an object may be decremented by an RC decrement of the object. Also, optimizing the RC updates before persisting the updates reduces the number of updates to the RCs in the persistent storage and allows only the surviving RC updates without any corresponding decrements to be rolled to the parent object of the lower hierarchical objects.

FIG. 1 shows an example of a system 100. The system 100 may include a processor 102 and a memory 104. The system 100 may include machine-readable instructions 106 stored in the memory 104 or another type of non-transitory computer-readable medium. The machine-readable instructions 106 stored on the non-transitory computer-readable medium may be executed by the processor 102 to perform the functions described in detail below. In another example, the system 100 may be implemented as a network of nodes (shown in FIG. 3), wherein each node has an object store locally, with its own processor, memory, persistent storage and machine-readable instructions. Each node may be implemented on servers, specialized hardware, and/or a hybrid of servers and specialized hardware. In another example, a node in the network of nodes may store objects on a persistent storage for that node.

In an example, the object store may use the signature of the objects to identify an object in persistent storage. The signatures may be generated according to a cryptographic function (e.g., by hashing the object according to the cryptographic function). In an example, creating a new object creates a signature for the new object using the cryptographic function. Modifying an existing object on the object store creates a new identifier for the modified object. Also, creating an object or modifying an object in the object store may result in concomitant update to parent objects and their signatures.

The system 100 may according to an example of the present disclosure minimize writing RC update to object record. The object record may be stored in persistent storage in an object index. The system may delay persisting an RC update of an object in the object store to process the RC update against other RC updates received during the delay in persisting the RC update to cancel out the RC update increments against decrements. The system may then persist the RC update to persistent storage, if the RC update is not completely canceled out. In an example, the system may delay the persistence of the RC update using a bucket buffer such as shown in FIG. 3 to receive another RC update. The bucket buffer may store the RC update that changes the RC of an object in persistent storage for further processing. In an example, the system 100 may generate an RC update (e.g., an intent to change the RC on the object record in persistent storage) for each object attached to a first parent or grandparent object. The system 100 may collect the RC updates to discard transient updates by waiting for opposing updates to the object record in other RC updates received or stored in the bucket buffer. The RC updates may be stored in the bucket buffer if system resources allow storage, or based on a timer or based on other policy requirements of the object store such as reliability, speed of access and the like. In an example, the bucket buffer may allow increments and decrements to be stored for objects received during a delay in persisting the objects to persistent storage and may allow matching increments and decrements to be offset against each other irrespective of the time of arrival of the increments and decrements or order of arrival of the RC updates.

The machine-readable instructions 106 may include instructions 108 to generate an RC update for a child object. For example, the system 100 may receive an input/output (I/O) operation affecting an object stored in the object store such as an I/O operation from a namespace layer. An RC update may be generated for an object affected by the I/O operation. In an example, an I/O operation may be an operation from a virtual machine accessing an object on a node in a federated system of nodes.

In an example, the machine-readable instructions 108 may determine the RC update for a child object related to a grandparent object. The machine-readable instructions 108 may determine the RC update for the child object by determining a signature for the child object and identifying its RC in an object record stored in an object index. In an example, the child object attached to a first grandparent object may have a parent object and child objects in turn attached to the parent object. A grandparent object (e.g., a first grandparent object) may be an object in the object store with at least a child and a grandchild. In an example, the grandparent object may be separated from a child object on a leaf node by more than one parent. For example, the root object may be separated from the child object by more than one parent object of the farthest child object from the root object. The grandparent object may be located a first hierarchical distance from the root object. For example, assume n is a hierarchical level of the root object from the farthest child object. The instructions 108 may generate the RC updates of child objects that are at or below the n−2 hierarchical level from the root object and are children of a first grandparent object. The RC updates at the n−2 hierarchical level may include RC updates for the first grandparent object, the parent object attached to the grandparent object and the child object, i.e., three levels. The child object is located at a hierarchical distance of n from the root object. The parent object is located at a hierarchical distance of n−1 from the root object. The first grandparent object is located at a hierarchical distance of n−2 from the root object. In another example, the first grandparent object may be located at a distance of at least four levels, i.e., more than three levels. The farthest child object of the first grandparent object may be separated by more than one parent object. The system 100 may determine the distance based on the system resources available to concurrently process the RC updates for objects that are located below the first grandparent object. The system 100 may also move laterally at the same level with the same number of hierarchical levels until RC updates of objects below the same level of the first grandparent object are persisted.

The instructions 108 may store RC updates for child objects in a bucket buffer. In an example, the bucket buffer may allow processing of the RC updates to cancel incrementing updates against decrementing RC updates. In an example, the bucket buffer may allow optimization of RC updates irrespective of the order in which the RC updates were received in the bucket buffer. Thus, the bucket buffer allows for optimization of RC updates before the RC updates are persisted to persistent storage on the object store such as on flash media, memristors, Intel OPTANE™ memory or the like.

The machine-readable instructions 106 may include instructions 110. The instructions 110 may delay persisting RC updates to persistent storage. In an example, the instructions 110 may minimize writing RC updates to the object record on persistent storage to cancel the RC updates against other RC updates received during the delay in persisting the RC updates. For example, the instructions may cause an RC update to be placed in the bucket buffer to wait for another RC update or to cancel the RC update against an earlier received RC update stored in the bucket buffer before persisting the minimized RC update to persistent storage. The instructions 110 may identify RC updates to child objects using their signatures.

The instructions 112 may match an incrementing RC update and a decrementing RC update to the child object. The instructions 112 may thus minimize the RC update. In an example, the bucket buffer may be associated with a grandparent object, e.g., RC updates of all the child objects of the same grandparent object may be stored in the same bucket buffer. In another example, the bucket buffer may be associated with each object being processed for RC update.

In an example, changing the contents of a child object may result in the generation of a new parent object and a concomitant transient change in the RC of the child object while the system 100 transitions to the new parent object. In an example, signatures of objects that are under a parent object may be included in the contents of the parent object.

In an example, moving files between directories in an object store may move objects from a first parent object to a second parent object. The move operation may delete files in the first directory, i.e., objects under the first parent object, and recreate the objects under the second parent object. Moving a child object of the first parent object to the second parent object produces a transient increase in the RC of the child object of the first parent object when the child object is copied over to the second parent object as an RC increment. Then, the RC of the child object of the first parent object is decremented when the child object is deleted from the first parent object. The system 100 may minimize writing the RC updates to object records of the objects attached to the first grandparent object of the child objects. In an example, the RC update of the objects attached to the first grandparent object may be local, i.e., they may be stored next to each other. For example, the first parent object and the objects stored under the first parent object may be created at approximately the same time and may be stored close to each other. This minimizes the RC update writes to persistent storage at the n−1 hierarchical level or multiple hierarchical levels and reduces write amplification to media.

The machine-readable instructions 106 may include instructions 114 to persist RC updates that have been minimized, i.e., RC updates that increment and decrement the RC of an object in the persistent storage are canceled, and the remainder of the RC updates is persisted. In an example, the RC update persistence minimization may be localized. The system may vertically divide the hierarchy of objects from the root object to the child object in the object store. In an example, vertically dividing the objects in the object store may mean the system processes RC updates of child objects of a first grandparent object at a fixed hierarchical level shown in FIG. 2A as a dotted triangle. The first grandparent object is shown in the FIG. 2A on the extreme right but any dotted triangle at the same hierarcical level may be chosen. After processing RC updates at the first hierarchical level, the system 100 may then process RC updates of child objects of a second grandparent object in the object store as discussed below with reference to FIG. 2A. Vertically dividing the objects in the object store may allow objects to be persisted using a write to a persistent storage instead of many writes and may minimize write amplification. The instructions 114 may persist a minimized RC update by updating an RC index on persistent media. In an example, persisting the minimized RC or optimized updates may mean storing the new RC update at a physical location on a persistent storage device such as updating an object index and/or an object record of the object. In other examples, persisting the minimized RC updates may mean transmitting the RC updates to other peers on a federated peer-to-peer network such as the network shown in FIG. 3.

The machine-readable instructions 106 may include additional instructions. For example, additional instructions may include instructions to determine the RC update to child objects attached to the second grandparent object. In an example, the child object attached to the second grandparent object may include a parent object and child objects in turn attached to the parent object. In an example, the second grandparent object may be located at the same hierarchical distance from the root object as the first grandparent object. For example, the system 100 may receive an I/O instruction from a virtual machine through the namespace layer that interfaces with the object store. The system 100 may determine whether the I/O instruction affects the second grandparent object at the first hierarchical level from the root object. The machine-readable instructions may then optimize grandparent objects located at the first hierarchical level from the root object one at a time. Thus, the system 100 may optimize objects at or below the first hierarchical level from the root object. Thus, the system 100 may processes RC update to minimize writing the RC update to an object record at a sub-DAG level (e.g., sub-tree level). In examples, RC update optimizations to minimize writing RC updates to object records of objects at the first hierarchical level may be processed in parallel or in series. For example, when system 100 has sufficient resources the RC update optimizations may be performed in parallel, i.e., multiple sets of objects at the first hierarchical level may be processed simultaneously. When the system 100 resources are required to perform other instructions, the RC update optimizations may be performed in series, i.e., one set of objects at the first hierarchical level before the second set of objects at the first hierarchical level is processed. Once the RC updates are persisted at the first hierarchical level the system 100 may process the RC updates at a second hierarchical level horizontally moving to include one or more objects above the previous level or first hierarchical level. The second hierarchical level may in examples be one or two hierarchical levels above the first grandparent object.

Figure 2A:
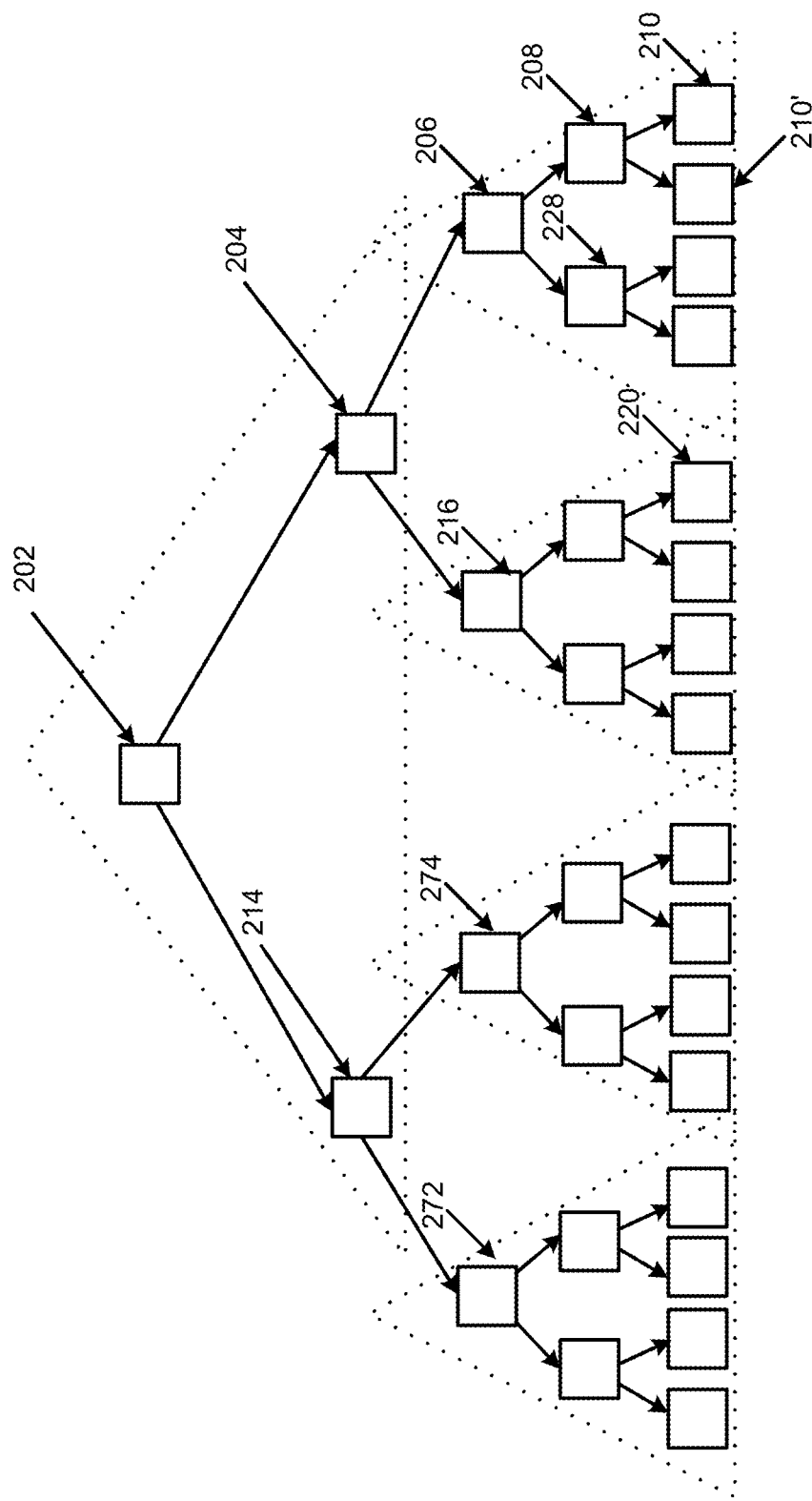
FIGS. 2A and 2B illustrate examples of hierarchical relationships between objects on an object store and optimization of RCs.

Referring to FIG. 2A, the figure illustrates a hierarchical relationship between objects in an object store and optimization of an RC update. In an example, a node in a system of federated nodes may store an object in an object store with a root object 202. In an example, the contents of the root object 202 may include a signature of its children, such as object 204 and object 214 immediately below the root object 202 and all the objects shown below the root object 202. The object 204 may include the signature of its children such as all the objects shown below object 204 including 206, 216, 208, 210, 228, 220, and the like. The objects 206, 208 and 210 are also considered child objects of the root object 202. The object 210 is an example of a child object farthest from the root object 202. Other objects on the same level as the object 210 (e.g., 210'; and 220) are also child objects farthest from the root object 202. The object 210 may be located a hierarchical distance of n from the root object 202. The object 208 may be referred to as the parent object of the child object 210. Similarly, the object 210 may be referred to as the child object of the object 208, and the object 208 may be referred to as the parent object of the object 210. Also, the object 206 may be referred to as the grandparent object of the object 210. The object 210 may be referred to as the grandchild of the object 206. In an example, a grandchild may also be referred to as a child, because the grandparent object contains a reference to the unique signature of the child.

In an example, an object 216 and the object 206 may be located at a hierarchical distance of n-2 from the root object 202. In an example, the object 206 may be referred to as a first grandparent object of the object 210 and the object 210 may be referred to as the grandchild or child object of the object 206. Similarly, the object 216 may be referred to as a first grandparent object of the object 220, and the object 220 may be referred to as the grandchild or child object of the object 216. As shown in FIG. 2A, the object 216 and the object 206 may be at the same hierarchical distance from the root object 202. Similarly, the object 214 and 204 may be at the same hierarchical distance from the root object 202. In an example, the object 216 may be a second grandparent object located at the same hierarchical distance from the root object 202. The object 216 may be referred to as the second grandparent object. The object 216 may be a grandparent of the object 220. The object 216 may also be related to the object 210 through object 204 and may also be referred to as the grandparent of the object 210 due to the hierarchy of objects from the root object 202.

The system 100 may generate local reference updates. For example, the system 100 may generate a local reference update for child objects 210, 208 and other child objects of the object 206. In other words, the system 100 may generate RC updates for child objects attached to the first grandparent object 206. The object 206 is located at a first hierarchical distance from the root object 202. The system 100 may minimize writing RC updates to object records of the child objects such as 208, 210 and the parent object 206 across multiple hierarchical levels to benefit from increments and decrements that are more likely to follow each other due to the hierarchy between the first grandfather object and its children. For example, changing the contents of a child object may generate a new parent object and produce transient change to the RC. Also in an example, updates may be localized to adjacent objects. For example, objects may be created to house images in directories on the object store. These objects may be created at the same time and therefore may be stored next to each other. For example, in the same persistent storage.

In an example, system 100 may implement a minimized RC update to reduce the wear on the persistent storage. A minimized RC update may be an RC update optimized by collecting or delaying RC updates for an object in a bucket buffer and canceling the increments and decrements to the RC object record for that object between the RC update and another RC update received when the RC update is temporarily stored in the bucket buffer. In an example, another RC update may be received prior to the RC update and temporarily stored in the bucket buffer until the RC update is received. The system 100 may minimize the RC update by canceling the increments, and decrements of the RC updates (e.g., the RC update and another RC update) for the object in the bucket buffer. The minimized RC update may reduce the writes to the object record of the object on the persistent storage. In an example, the first grandparent object 206 and all child objects under the first grandparent object 206 may be optimized at the same time instead of optimizing the farthest child objects such as object 210' and 210 one at a time. The system 100 may collect the updates to the RC of child objects of the object 206 in a bucket buffer as discussed above. In an example, the system 100 may collect the increments and decrements of each of the children of the first grandparent object 206 at a hierarchical level of n-2 from the root object. In an example, an RC update may be an increment when a parent object adds a reference to an existing child object. In an example, an RC update may be a decrement when a parent object dereferences a child object. The system 100 may use an RC update instead of saving the object a second time to save space, i.e., deduplication of storage.

In an example, the system 100 may minimize writing RC updates to object records of the child objects attached to the first grandparent object by delaying persistence of the RC updates to persistent storage and canceling the increments and decrements in RC updates received during the delay in persistence of the RC update. For example, the system 100 may minimize writing RC updates to object records of the child objects using the bucket buffer. The system 100 may process the collected RC updates of the children of the first grandparent object such as object 210, 210', 208 and 228 to identify increments and decrements to the RC for each object. The system may use the bucket buffer to increment or decrement the RC. In an example, the bucket buffer may allow increments or decrements that are not consecutive to be processed together. In an example, the bucket buffer may be implemented on a transactional persistent storage to guard against loss. In an example, the bucket buffer may be implemented on an NVMe (non-volatile memory express) device.

The system 100 may cancel the increments and corresponding decrements to the RC for each object based on the collected RC updates in the bucket buffer. Thus, the system 100 may avoid write amplification, which may traverse up to the root object 202.

In an example, the system 100 may determine an RC update for a child object attached to a first grandparent object. For example, the object 206 may be the first grandparent object of object 210, and object 210 may be the child object of the object 206. The system 100 may determine an RC update for the child object attached to the first grandparent object, wherein the first grandparent object is located at a first hierarchical distance from the root object 202. For example, objects 210, 210' may be located at a hierarchical distance of n from the root object 202. The object 206 may be located at a hierarchical distance of n−2 from the root object 202. The system 100 may delay persisting the RC update for the child object 210 by collecting the determined RC update for the child object 210 in the bucket buffer of the object 206 to process the RC update against another RC update in the bucket buffer. Another RC update may be present on the bucket buffer before the determined RC update is received or may be received in the bucket buffer after the determined RC update. The system 100 may as discussed above sort the RC updates in the bucket buffer to identify increments and corresponding decrements irrespective of the order in which the increments and decrements arrive. The system 100 may minimize writing RC updates to object records by incrementing and decrementing the RC updates. In an example, an RC of zero may indicate the increments and decrements cancel each other. In an example, the system 100 may delay RC updates that increment the RC. The system 100 may not delay persisting RC updates that decrement the RC when there is no incrementing RC update already present in the bucket buffer. An incrementing RC update is more likely to be followed by a decrementing RC update, as opposed to a decrementing RC update followed by an incrementing RC update.

In an example, the system 100 may update objects adjacent to the first grandparent object 206 after the RC updates to the objects under the first grandparent object 206 are persisted to persistent storage. The RC updates at the same hierarchical level may be processed first to minimize the updates to parent objects of the first grandparent object 206 or other objects located above the first grandparent object 206. For example, the object 216 may be a second grandparent object of object 220 located at the first hierarchical distance or the same hierarchical distance as the first grandparent object 206. In an example, the object 216 may be located at a hierarchical distance of n−2 from the root object 202. In an example, the system 100 may minimize writing an RC update to an object record for the child object under the second grand parent object 216. For example, the system 100 may minimize writing an RC update to an object record for the object 220. For example, the system 100 may delay writing the RC update to wait for an update that may cancel the earlier RC update. The system 100 may persist the minimized RC update obtained by canceling the RC update against another RC update received for the object 220. The system 100 may process similar grandparent objects shown in dotted triangles at the first hierarchical level. The system 100 may process all grandparent objects at the first hierarchical level before rolling up the DAG (e.g., tree). In an example, the hierarchical object structure may be a DAG (e.g. a tree).

In an example, the system 100 may determine RCs of parent objects of the first grandparent objects. For example, the system 100 may determine the RC of objects attached to 204 and 214. The system 100 may delay processing the RC update of objects 204 and 214 and objects under these objects to receive another or other RC update for the objects 204, 214 and other objects under these objects. The system may cancel the other RC update and the other or another RC update to minimize writing RC updates to object records for the objects at a second hierarchical distance. In an example, the object 204 may be at a hierarchical distance of n−4 from the root object 202. The object 204 may be at the second hierarchical distance. The system 100 may process the RC updates of all child objects of the object 204 before processing the RC updates of child objects of the object 214. The system 100 may persist the minimized RC update for the grandparent objects such as object 204 and 214. The system 100 may then determine whether the object 204 at the distance of n−4 is the root object. In response to the determination that the object 204 at the distance of n−4 is the root object, the system 100 may move back to the object 210 farthest from the root object or at a hierarchical level of n from the root object or its siblings 220 and the like and continue optimizing the RC updates. In other words, the system 100 will continue to move up horizontal levels after RC updates are persisted for objects at each hierarchical level that may be processed based on the vertical division shown as dotted triangles in the figure at the same hierarchical level. Then the process may start over at the leaf node, i.e., the farthest child object.

In an example, the system 100 may determine RC of objects attached to a grandparent object two hierarchical levels above the grandparent objects that were updated at the n−2 level. For example, the system 100 may collect the updates of objects attached to object 202 such as object 214 and 204. The system 100 may optimize the RC for the objects 214 and 204. The system 100 may persist the changes to the RC for objects 214 and 204 and roll-up the DAG (e.g., tree). When the system 100 reaches the root object 202, the system 100 may minimize writing RC updates to object records for the child objects and optimize and update the RC for the root object. For example, the system 100 may process the RC updates of objects that are grandparents of the grandparent objects that were earlier processed. The system 100 may continue to process the RC updates in the vertical hierarchical level such until the root object is reached and the RC update for the root object is processed. For example, the object 202 is the grand parent of the object 206. The system 100 may process the RC update for the object 202 once the RC update for the objects below the grandparents 272, 274, 216 and 206 are processed.

In an example, the system 100 may determine RC of objects attached to a grandparent object one hierarchical level above the grandparent object that were updated at the n−2 hierarchical level. For example, the system 100 may process the updates to the object 204, then object 214 and corresponding child objects below object 204 and 214 before processing the updates for the object 202. In an example, the system 100 may move up one level at a time at the higher hierarchical changes based on policy. For example, the upper hierarchical levels may be required to be more stable in a policy and updates infrequent. In an example, the system 100 may determine whether to move up one level at a time or more levels based on the number of RC updates that need to be processed at the upper hierarchical levels. The system 100 may determine the RC updates for the objects attached to the grandparent object, cancel the RC updates increments and decrements for objects that have both in the bucket buffer (i.e., minimize writing RC update to object records) and persist the minimized RC updates to persistent storage. In an example, the system 100 may continue to roll-up the DAG (e.g., tree) until the root object 202 is reached and updated.

In an example, the system 100 may determine the first hierarchical distance from the root object based on a mathematical algorithm. For example, the first hierarchical distance from the root object may be two-thirds of the distance between the root object and the farthest child object from the root object. In examples, the first grandparent object may be separated from the farthest child object of the first grandparent by more than n–3 levels. In other words, the first grandparent object may have two objects between itself and the child object. The system 100 may collect the objects using any variation to divide the child objects hierarchically, while including multiple hierarchical levels. Also, the system 100 may collect the objects to vertically separate the hierarchical objects at or below the same hierarchical level.

Figure 2B:
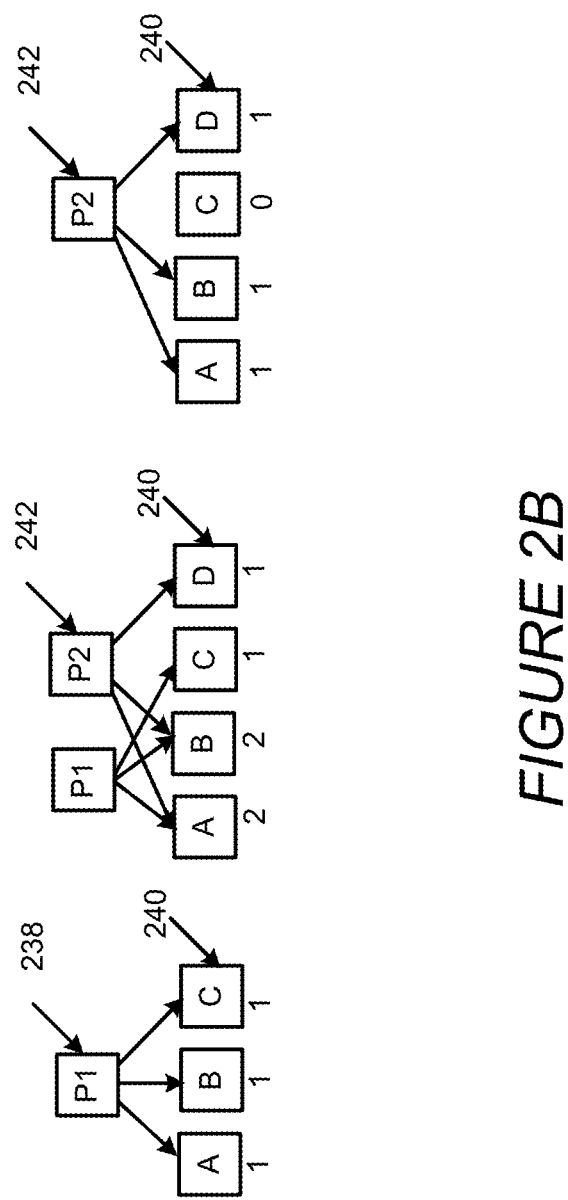

Referring to FIG. 2B, the figure illustrates a hierarchical relationship between objects in an object store and optimization of an RC updates for the object store. FIG. 2B shows an optimization when a new object is generated in the object store. FIG. 2B also illustrates a transition from an old parent object to a new parent object according to an example. For example, the parent objects P1 and P2 exhibit a hierarchical relationship to child objects storing A, B, C and D. The numbers below the child objects depict the RCs for the objects A, B, C and D. The RC may be stored in the object record or may be stored as an intent to change the RC in the object record, i.e., an RC update. The system 100 may delay persisting RC updates using the bucket buffer as described below. The delay in persisting the RC updates to the object records on the persistent storage may allow the system 100 to receive other RC updates. The RC updates and other RC updates may be increments and decrements in RC for the object record. The system may thus minimize writing RC updates to persistent storage based on subsequent RC updates.

In an example, the object 238 may be a parent object P1. A parent object in an object store may include an signature of the child object, such as object 240. A change in the contents of object 240 such as a change from C to D in the object 240 may result in a change of the signature of the object 240. A new parent object such as object 242 may be generated including the new signature of the child object. In an example, the new object 242 may include references to objects with the contents A, B and D. The old parent object may reference the objects with the contents A, B and C. As the system 100 transitions to the new parent object 242 the old parent object 238 may continue to reference child objects with the contents A, B and C. During the transition to the new object, the system 100 may increment the RC of the objects with the contents A and B to two to indicate two objects P1 and P2 reference the objects. The system 100 may then subsequently receive a decrement update to decrement the RC for objects with the contents A, B and C by one when the old parent object 238 is removed. The system 100 may store the RC updates for the child objects in a bucket buffer to avoid write amplification due to intermediate changes. The system 100 may cancel the RC update increments and decrements in the bucket buffer to avoid persisting temporary changes all the way up to the root of the object store. For example, the RC updates for objects with the contents A and B shown in the intermediate state in the middle of FIG. 2B may be collected in the bucket buffer, canceled against each other and not written to the object record, i.e., not persisted because the cancel each other out.

FIG. 3 depicts an example of a bucket buffer to collect RC changes. In an example, the RC updates to an object index 302 may be delayed using a bucket buffer 304 to allow the system to cancel the RC updates against other RC updates. The other RC updates may be on the bucket buffer 304 or may be received during the delay in persisting the RC updates to the object index 302. The FIG. 3 shows an object index 302, a bucket buffer 304 for each object, RC updates 310, 306 and 308. In an example, the system 100 may implement the bucket buffer 304 for each object. In another example, the system 100 may implement one bucket buffer 304 for all the objects, or a bucket buffer may be implemented for some of the objects. The system 100 may distinguish between objects in the bucket buffer 304 using signatures of the objects. The system 100 may identify the RC updates that increment and decrement the RC on the object index 302 of each unique object, and cancel the increments and decrements in the bucket buffer to minimize writing of each increment and decrement to the object record in the object index 302. The system 100 may cancel the increment and decrement the RC updates for the object instead of writing the RC changes instantly to the object index 302. The system 100 may instead write the minimized RC update to the persistent storage. In another example, the system 100 may implement multiple bucket buffers as shown in FIG. 3.

In an example, the system 100 may implement the bucket buffer 304 for objects that are locally stored such as on an object store located on persistent memory on the node. In another example, the system 100 may implement the bucket buffer 304 for objects attached to the first grandparent object as discussed above. The system 100 may receive RC updates shown as 308, 306 and 310. The RC updates may increment the RC of an object such as object 210 or may decrement the RC of an object such as object 210. In an example, the RC update 308 may be an increment update. The system 100 may delay persisting the RC update 308 to the index 302 to identify another RC update to the index 302 that cancels the RC update 308 to minimize writing RC update to object record.

The system 100 may use other RC updates from the bucket buffer 304 such as update 306 and 310 to minimize writing RC update to object record for the object 210. Assume update 310 is a decrement to RC of the object 210. The system 100 may minimize writing the RC update to the object record for the object 210 by canceling the increment and the decrement of the RC for the object. The system 100 may then persist the minimized RC update. In an example, the system 100 may have no change to persist to the index 302, when increments and decrements cancel out each other.

Figure 4:
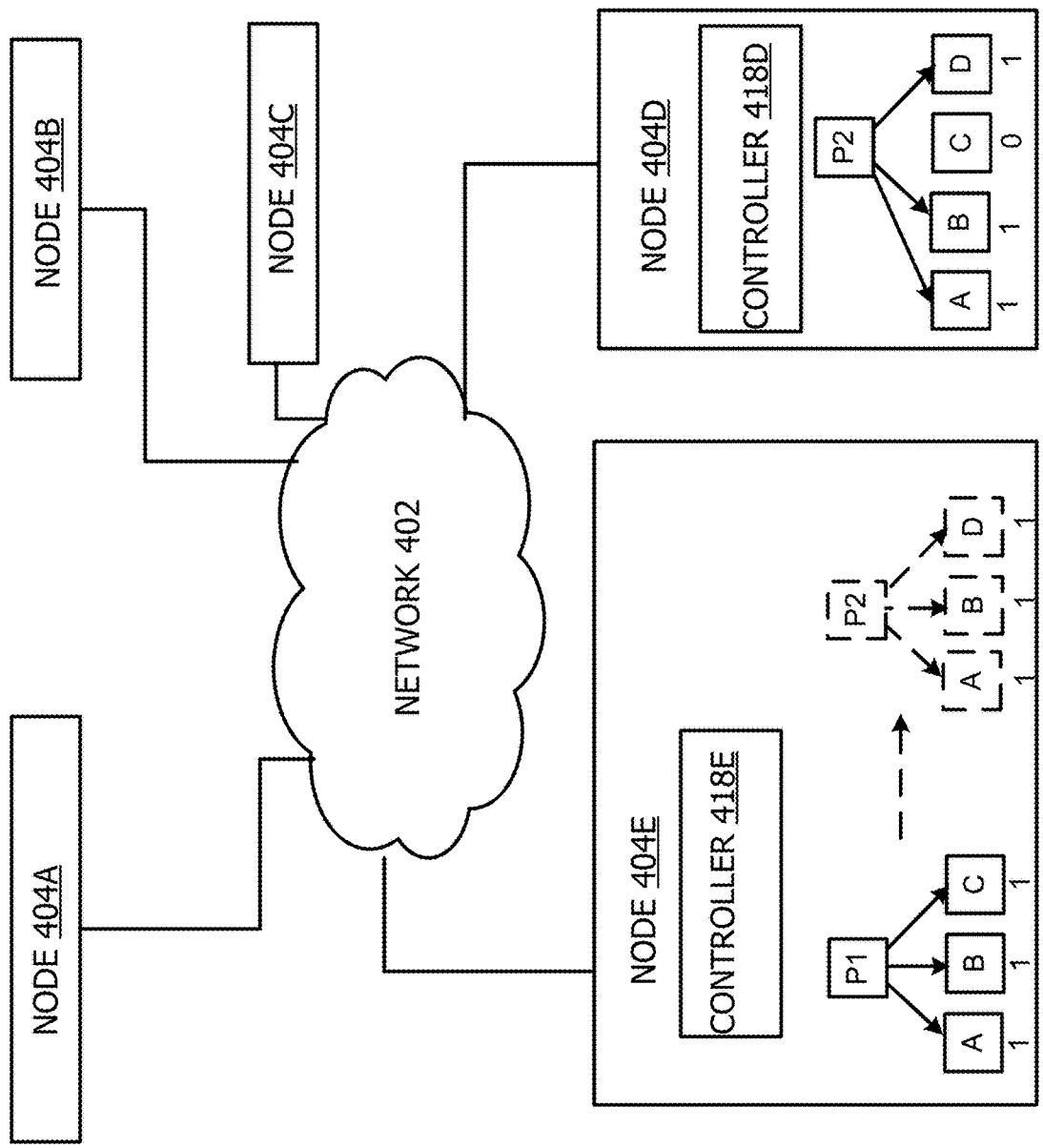
FIG. 4 illustrates an example of a system comprising a federated system of nodes to minimize writing an RC update to object record in persistent storage.

FIG. 4 depicts an example of the system 100 implemented as a federated system of nodes. The nodes 404 shown as 404A-E may interact through a network 402. The network 402 may be any network such as a local area network, a wide area network and the like. In an example, the network may be a wireless network such as a microwave link, a satellite link, a cellular link, a laser link, a fiber optic network, and the like. In an example, the nodes may be collocated within the same facility. In other examples, the nodes may be in different geographical locations. The nodes 404 may include controllers 418, a processor and machine-readable instructions as described above with reference to FIG. 1. In an example, a controller may be implemented as a virtual controller, a hardware controller or a hybrid.

The controllers 418 may use a namespace layer to manage and maintain the object store. A node, such as node 404E, may receive an I/O request to store a new object. The controller 418E may determine the signature of the new object according to the cryptographic function. The controller 418E may then determine duplicate objects in the system 100 using the cryptographic function. The controller 418E may then determine the RC updates for the new object, which is identical to the duplicate objects identified based on the new object signature. An object index for node 404E, similar to the object index 302 shown in FIG. 3, may include the RC, i.e., the number of times the object is referenced or stored in the object store, for a duplicate object.

In an example, the system 100 may have a policy requiring redundant backups to node 404E. In other examples, the nodes 404C and 404B may serve as storage locations that may be utilized based on availability or policy settings on the nodes 404 or systems accessing the nodes 404. The controller 418E may communicate with the controller 418D to synchronize the files in the object store. The signatures of objects with the contents A, B, C and D respectively are generated based on their content. As discussed above, when a new object is received, its signature may be compared to signatures of stored objects to determine whether the new object is a duplicate. If the new object is not a duplicate, the new object may be written to persistent storage.

In an example, the controllers 418 may minimize writing RC updates to object records before sharing updates over the network to save bandwidth and increase the write bandwidth. For example, the controller 418D may minimize the RC updates for the Node 404D. The controller 418D may minimize persisting the RC updates to the object records for transient changes by waiting for further updates before writing the RC updates to persistent storage.

In an example, the controller 418E and 418D may synchronize the storage of objects in the object store stored on persistent storage present on the nodes 404E and 404D. For example, during back up operations, the controller 418D may transmit to controller 418E the digests of the objects in the node 404D, such as the signature of the root object and the root object. In an example, the signature of the root object is a snapshot of the entire object store. The node 404E may use the signature of the root object and the root object contents received from node 404D to determine the changes in the objects. Any new objects generated on node 404D may be synchronized to the node 404E by transferring only the objects that are new on node 404D. This synchronization of objects across nodes may be optimized by minimizing transient RC updates. For example, FIG. 4 shows parent P1 and child objects A-C stored in node 404E. Assume the node 404D also stored the same parent P1. The node 404E may be a backup node to node 404D. The P1 parent object on node 404D may be replaced by P2 parent object (FIG. 4 shows P2 stored on 404D but assume it replaced P1). For example, the child object with the content C may be deleted and replaced by child object with the content D, and the node 404D may have the RCs 1, 1, 0 and 1 respectively for the child objects with the contents A, B, C and D, as shown in FIG. 4. However, synchronizing the new parent object P2 before persisting the RC updates to persistent storage may result in transient increases for the object A and B which may be referenced by P1 and P2 to be transmitted to the node 404E. The Node 404D may minimize the transfers over the network by waiting for the RC updates to be optimized and written to persistent storage before synchronization. After writing the RC updates to persistent storage, the controller 418D may synchronize by sending the final RC updates to the controller 418E. The controller 418E may then commit the final RC updates to persistent storage. The final RCs are shown for the node 404E in dashed lines, and include 1, 1, 1 for the objects with the contents A, B and D, respectively. Persistent storage may be any media including hard drives, tape drives, non-volatile solid-state storage such as solid-state discs, NVME storage, customized storage based on solid-state chips, memristors, OPTANE™ storage and the like.

Figure 5:
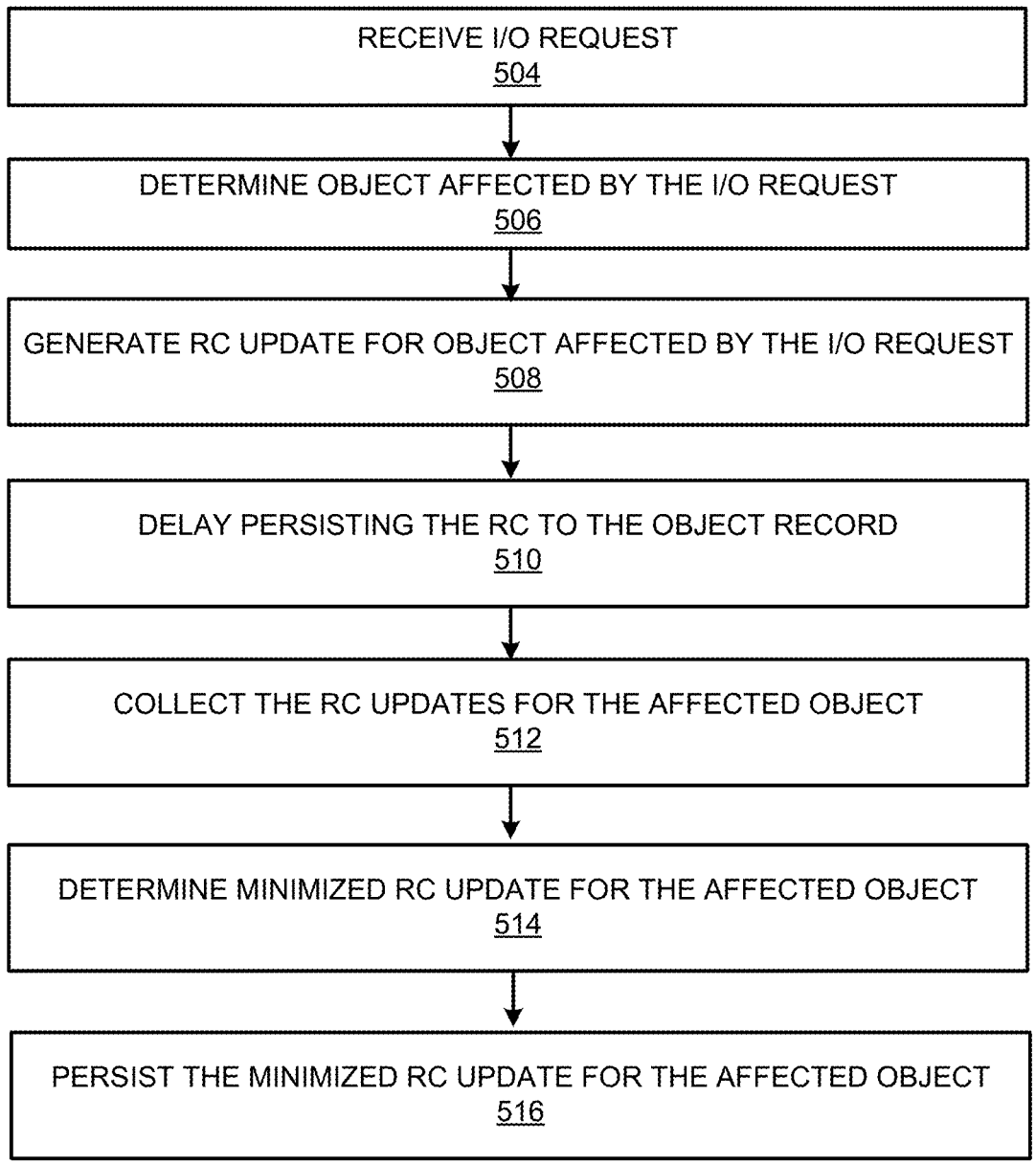
FIG. 5 illustrates a method according to an example to minimize writing the object record to persistent storage.

FIG. 5 illustrates a method 500 according to an example for migrating an object store. The method 500 may be performed by the system 100 shown in FIG. 1 or the system of nodes shown in FIG. 4.

At 504, the system 100 may receive an I/O request. In an example, the I/O request is from a virtual machine and may affect the RC stored in the object record of an object in the object store. In an example the object record may be stored in the persistent storage on a node or peer in a federated peer-to-peer network.

At 506, the system 100 may determine an object affected by the I/O request from the virtual machine. The system 100 may determine the object affected by the I/O request based on a cryptographic function. For example, the I/O request may create a new object, modify an existing object, or simply request an existing object be stored again. The system 100 may determine a signature for the object in the I/O request according to the cryptographic function (e.g., by generating a hash of the object using the cryptographic function). The system 100 may then identify if the same object has been stored before in the object store. The system 100 may then determine the effect of the I/O request on the object store, e.g., increment or decrement the RC of the affected object. In an example, the system 100 may receive the I/O request from a namespace layer or from virtual machines running on the nodes or accessing the nodes. In other examples, the nodes 404 as discussed above with reference to FIG. 4 may generate the I/O request during synchronization.

At 508, the system 100 may generate an RC update for the object affected by the I/O request. For example, the affected object may be child object 210 shown in FIG. 2A. Child object 210 is attached to first grandparent object 206 located at a first hierarchical distance from root object 202. The system 100 may then determine whether the I/O request increments or decrements an object index, such as object index 302 shown in FIG. 3, for the child object 210. In an example, the system 100 may determine the RC update for the child object 210 based on the signature of the child object 210. The RC update may be an increment or a decrement to the RC for the child object 210 in the object index 302. An RC of zero may indicate the object is no longer required and may be deleted. An RC of more than one may indicate the object is referenced by more than one parent object.

At 510, the system 100 may delay persisting the RC update to the object record for the affected object to identify an opposing RC update. Thus, the system 100 may minimize writing the RC update to the object record. For example, the system may delay persisting the RC update for the child object 210 and wait for a further RC update to the child object 210. In an example, a decrement followed by an increment is less likely compared to an increment followed by a decrement, so the system 100 may not delay persisting a decrement followed by an increment. However, the system 100 may delay processing of an increment. The system 100 may delay the RC update to the bucket buffer 304 to allow for another RC update to decrement the RC update. The system 100 may cancel the RC update and another RC update to minimize writing the RC update to the object record.

At 512, the system 100 may collect the RC updates for the affected object, e.g., the child object 210, in the bucket buffer 304 shown in FIG. 3. In an example, the bucket buffer 304 may collect RC updates to objects that are stored close to each other in persistent storage. The system 10 may collect RC updates by storing them in temporary memory such as non-volatile memory.

At 514, the system 100 may determine a minimized RC update for the affected object, e.g., the child object 210. For example, the system 100 may determine the RC updates in the bucket buffer 304 that belong to the child object 210 using the signature of the child object 210. The system 100 may cancel out opposing RC updates, such as increments and decrements to the RC of child object 210 irrespective of the order or time in which the updates arrive in the bucket buffer 304. The system 100 may minimize the RC update to the object record for the child object 210 by canceling out increments and decrements in the bucket buffer 304.

At 516, the system 100 may persist the determined RC update for the child object to persistent storage. In an example, the system may have no RC update to persist when the RC updates cancel each other in the bucket buffer. Thus, the system 100 may reduce the number of changes to the object record for the object.

While embodiments of the present disclosure have been described with reference to examples, those skilled in the art will be able to make various modifications to the described embodiments without departing from the scope of the claimed embodiments.

What is claimed is:

1. A non-transitory computer-readable medium comprising machine-readable instructions that, when executed by a processor, cause the processor to:
   maintain an object store to store objects, each object being identified by a unique signature generated from content of the each object, and the objects being organized in a hierarchy that relates objects by associated signatures to a root object;
   generate a first update for a first reference count of a first child object below a first grandparent object in the hierarchy, wherein the first grandparent object is located at a first hierarchical distance from the root object;
   delay persisting the first update to a first child object record of the first child object;
   cancel an increment or decrement to the first reference count by canceling the first update against another update for the first reference count received while delaying persisting the first update to the first object record to generate an optimized first reference count;
   generate a second update for a second reference count of a second child object below a second grandparent object in the hierarchy, wherein the second grandparent object is located at the same first hierarchical distance as the first grandparent object;
   delay persisting the second update to a second object record of the second child object; and
   cancel an increment or decrement to the second reference count by canceling the second update against another update for the second reference count received while delaying persisting the second update to the second object record to generate an optimized second reference count.

2. The non-transitory computer-readable medium of claim 1, wherein the instructions cause the processor to delay persisting the first update to the first object record and the delay persisting the second update to the second object record in parallel.

3. The non-transitory computer-readable medium of claim 1, wherein the instructions cause the processor to delay persisting the first update to the first object record and the delay persisting the second update to the second object record in series.

4. The non-transitory computer-readable medium of claim 1 further comprising instructions that, when executed by the processor, cause the processor to persist the optimized first reference count and the optimized second reference count.

5. The non-transitory computer-readable medium of claim 4, further comprising instructions that, when executed by the processor, cause the processor to process reference count updates at a second hierarchical level after the optimized first reference count and the optimized second reference count have been persisted,
   wherein the second hierarchical level is above the first hierarchical level.

6. The non-transitory computer-readable medium of claim 5, wherein the second hierarchical level is a hierarchical distance of two from the first hierarchical level.

7. The non-transitory computer-readable medium of claim 5, wherein the second hierarchical level is a hierarchical distance of one from the first hierarchical level.

8. A method comprising:
   maintaining, by a hardware processor, an object store to store objects, each object being identified by a unique signature generated from content of the each object, and the objects being organized in a hierarchy that relates objects by associated signatures to a root object;
   generating, by the hardware processor, a first update for a first reference count of a first child object below a first grandparent object in the hierarchy, wherein the first grandparent object is located at a first hierarchical distance from the root object;
   delaying, by the hardware processor, persisting the first update to a first child object record of the first child object;
   canceling, by the hardware processor, an increment or decrement to the first reference count by canceling the first update against another update for the first reference count received while delaying persisting the first update to the first object record to generate an optimized first reference count;
   generating, by the hardware processor, a second update for a second reference count of a second child object below a second grandparent object in the hierarchy, wherein the second grandparent object is located at the same first hierarchical distance as the first grandparent object;
   delaying, by the hardware processor, persisting the second update to a second object record of the second child object; and canceling, by the hardware processor, an increment or decrement to the second reference count by canceling the second update against another update for the second reference count received while delaying persisting the second update to the second object record to generate an optimized second reference count.

9. The method of claim 8, wherein the delaying persisting the first update to the first object record and the delaying persisting the second update to the second object record are performed in parallel.

10. The method of claim 8, wherein the delaying persisting the first update to the first object record and the delaying persisting the second update to the second object record are performed in series.

11. The method of claim 8 further comprising persisting the optimized first reference count and the optimized second reference count.

12. The method of claim 11 further comprising processing reference count updates at a second hierarchical level after the optimized first reference count and the optimized second reference count have been persisted,
wherein the second hierarchical level is above the first hierarchical level.

13. A system comprising:
a processor; and
a memory storing machine readable instructions that, when executed, cause the processor to:
maintain an object store to store objects, each object being identified by a unique signature generated from content of the each object, and the objects being organized in a hierarchy that relates objects by associated signatures to a root object,
generate a first update for a first reference count of a first child object below a first grandparent object in the hierarchy, wherein the first grandparent object is located at a first hierarchical distance from the root object,
delay persisting the first update to a first child object record of the first child object,
cancel an increment or decrement to the first reference count by canceling the first update against another update for the first reference count received while delaying persisting the first update to the first object record to generate an optimized first reference count,
generate a second update for a second reference count of a second child object below a second grandparent object in the hierarchy, wherein the second grandparent object is located at the same first hierarchical distance as the first grandparent object,
delay persisting the second update to a second object record of the second child object, and
cancel an increment or decrement to the second reference count by canceling the second update against another update for the second reference count received while delaying persisting the second update to the second object record to generate an optimized second reference count.

14. The system of claim 13, wherein the instructions cause the processor to delay persisting the first update to the first object record and the delay persisting the second update to the second object record in parallel.

15. The system of claim 13, wherein the instructions cause the processor to delay persisting the first update to the first object record and the delay persisting the second update to the second object record in series.

16. The system of claim 13, wherein the memory further stores instructions that, when executed by the processor, cause the processor to persist the optimized first reference count and the optimized second reference count.

17. The system of claim 16, wherein the memory further stores instructions that, when executed by the processor, cause the processor to process reference count updates at a second hierarchical level after the optimized first reference count and the optimized second reference count have been persisted,
wherein the second hierarchical level is above the first hierarchical level.

* * * * *